United States Patent
Lue-Sang et al.

(10) Patent No.: US 7,954,110 B1
(45) Date of Patent: May 31, 2011

(54) OBSERVING PROPERTIES ASSOCIATED WITH AN OBJECT IN AN OBJECT-ORIENTED PROGRAMMING PLATFORM

(75) Inventors: Ronald D. Lue-Sang, Mountain View, CA (US); Ali T. Ozer, Redwood City, CA (US); Mark A. Piccirelli, Los Gatos, CA (US); Andreas W. Wendker, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 1356 days.

(21) Appl. No.: 10/873,697

(22) Filed: Jun. 22, 2004

(51) Int. Cl.
*G06F 13/00* (2006.01)
*G06F 17/30* (2006.01)

(52) U.S. Cl. ........................ 719/318; 707/802

(58) Field of Classification Search .................. 719/316, 719/318
See application file for complete search history.

(56) References Cited

U.S. PATENT DOCUMENTS

| | | | | |
|---|---|---|---|---|
| 5,634,124 A | * | 5/1997 | Khoyi et al. ........................ | 1/1 |
| 5,771,384 A | * | 6/1998 | Remington et al. .......... | 719/318 |
| 6,088,739 A | * | 7/2000 | Pugh et al. ..................... | 719/315 |
| 6,230,160 B1 | * | 5/2001 | Chan et al. ................. | 707/103 X |
| 6,427,231 B1 | | 7/2002 | Burke et al. .................... | 717/116 |
| 6,442,620 B1 | * | 8/2002 | Thatte et al. ................... | 719/316 |
| 6,918,123 B1 | * | 7/2005 | Shteyn .......................... | 719/318 |
| 6,993,771 B1 | * | 1/2006 | Hasha et al. .................. | 719/318 |
| 2002/0174262 A1 | | 11/2002 | Marcos et al. ................ | 709/315 |
| 2004/0003138 A1 | * | 1/2004 | Finocchio ..................... | 709/328 |
| 2004/0098406 A1 | | 5/2004 | Roddy ........................... | 707/103 |

* cited by examiner

*Primary Examiner* — Andy Ho
*Assistant Examiner* — Phuong N Hoang
(74) *Attorney, Agent, or Firm* — Williams, Morgan & Amerson, P.C.

(57) ABSTRACT

An application programming interface is provided in an object-oriented programming platform for developing applications. A method comprises registering a first object with a second object to observe one or more properties associated with the second object, the second object having a set of methods associated therewith and replacing a first implementation of a method in the set of methods associated with the second object with a second implementation of the method that automatically sends a notification to the first object. The observable objects need not explicitly invoke the observer notifications, avoiding writing of a large amount of code. These observer notifications need only be sent for objects that are actually being observed but are related objects, substantially reducing the performance overhead of needless invocations of the observer notifications without limiting binding between objects.

39 Claims, 8 Drawing Sheets

OBSERVING PROPERTIES ASSOCIATED WITH AN OBJECT IN AN OBJECT-ORIENTED PROGRAMMING PLATFORM

1. FIELD OF THE INVENTION

The invention generally relates to computer programming technique to operate object-oriented software programs, and more particularly, to providing an application programming interface in an object-oriented programming platform to observe properties associated with an object.

2. DESCRIPTION OF THE RELATED ART

Many computer programming languages are used for development of software programs. Object-oriented programming is popular since it offers programming flexibility with a relatively simple structure. Object-oriented programming is a simple way of creating software programs using building blocks, and forming relationships for these building blocks. Such building blocks in object-oriented computing systems are generally called "objects." An object is a programming unit or a software entity that combines a data structure (e.g., instance variables) with the operations that can operate on that data. In object-oriented programming, these operations that can be performed on the data are generally called "methods."

For example, an object-oriented program comprises a collection of software entities known as objects, each of which is responsible for performing a particular task. Every object is characterized by associated properties, or data values, and one or more methods that provide certain behavior or functionality. In operation, one object invokes the methods of another object, to cause the second object to exhibit its associated behavior.

Using objects, an object-oriented software application may define its data and the methods that operate on the data. An object may communicate with another object by sending messages. For example, when one object desires to operate on data that resides in another object or needs to execute methods in another object, it sends a message. The requesting object identifies the intended operation by specifying a method. The requesting object can further send arguments that may be used by the responding object in performing the named method. The responding object performs the method requested in the message. In this manner, the data provided by the requesting object may be used to perform the indicated operation by the method.

When a programmer defines a method, he or she specifies the classes or identities of the arguments appropriate for the method. A class is a programming language concept that allows data and methods to be grouped together. The class concept is fundamental to the notion of an object-oriented programming language. The methods of a class define the set of permitted operations on the class's data (its attributes). This close tie between data and operations means that an instance of a class—an object—is responsible for responding to messages defined by its class. As a basic building block of object-oriented programming, classes define types of objects by specifying their properties (data) and the procedures ("methods") they support.

Programming in an object-oriented computing system requires the programmer to build a structure for the set of objects, which defines how properties and methods are to be manipulated. For example, developing applications with user interface programming, such as two-dimensional drawing techniques require efficient observation information storage and manipulation when working with objects. However, designing such a structure can not only be a complex and difficult task but a relatively inefficient one because of the overhead associated with object interactions, sending a large number of messages and notifications back and forth between the objects.

In developing applications with user interface programming, objects may need to be notified of changes to specified properties of other objects by accessing an object's properties indirectly. However, one problem is that observable objects explicitly invoke the observer notifications, requiring a large amount of code which must be written. A secondary problem is that part of the performance cost of sending observer notifications is borne not only by objects that are actually being observed but other related objects as well which are not observed, which means that the performance overhead of needless invocations of the observer notification machinery is relatively high. Moreover, an observer may have to inspect the entirety of the related objects collection to find out what objects have been inserted, removed, or replaced.

In an Operating System (OS) environment, a binding feature provides an ability to easily connect user interface items to model code being the classes which encapsulate domain specific information and their application. This binding feature uses a mechanism called "key-value observing" that allows objects to be notified of changes to specified properties of other objects. The key-value observing makes objects to easily bindable. For example, a graphical user interface (GUI), such an interface builder, may be used to bind text fields, checked boxes and table views to controller objects and model objects. However, some observation systems using observer notifications can indicate that employee objects are related to a manager object but after a change in manager-employee relationships, it is difficult to determine which employee objects become related or unrelated to the manager object.

The present invention is directed to overcoming or at least reducing one or more of the problems set forth above.

SUMMARY OF THE INVENTION

In one aspect of the instant invention, a method is provided for providing an application programming interface in an object-oriented programming platform. The method comprises registering a first object with a second object to observe one or more properties associated with the second object, the second object having a set of methods associated therewith and replacing a first implementation of a method in the set of methods associated with the second object with a second implementation of the method that automatically sends a notification to the first object.

In another aspect of the instant invention, an article comprising a computer readable storage medium storing instructions is provided. The instructions that, when executed cause a processor-based system to register a first object with a second object to observe one or more properties associated with the second object, the second object having a set of methods associated therewith and replace a first implementation of a method in the set of methods associated with the second object with a second implementation of the method that automatically sends a notification to the first object.

In yet another aspect of the instant invention, an object-oriented computing system is provided. The system comprises a processor, a memory coupled to the processor, the memory storing a data file structure including an identification of a first and a second object in a software program, one or more properties and a set of methods associated with respective the first and second objects and instructions for registering the first object with the second object to observe the one or more properties associated with the second object, and an interface to replace a first implementation of a method in the set of methods associated with the second object with a second implementation of the method that automatically sends a notification to the first object.

In still another aspect of the instant invention, an application programming interface for managing relationships of objects in an object-oriented computing system is provided. The application programming interface comprises means for registering a first object with a second object to observe one or more properties associated with the second object, the second object having a set of methods associated therewith and means for replacing a first implementation of a method in the set of methods associated with the second object with a second implementation of the method that automatically sends a notification to the first object.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Embodiments of the present invention provides for an application programming interface for use with an object-oriented computing system. The application programming interface uses a key-value observing mechanism by which objects may be registered and deregistered as observers of specific properties of other objects, and by which observed objects may notify observers of changes to properties according to one embodiment of the present invention. The key-value observing mechanism is based on a key-value coding mechanism which provides for executing an object's properties indirectly. That is, using strings to identify properties, rather than through invocation of an accessor method or as instance variables.

Figure 1:
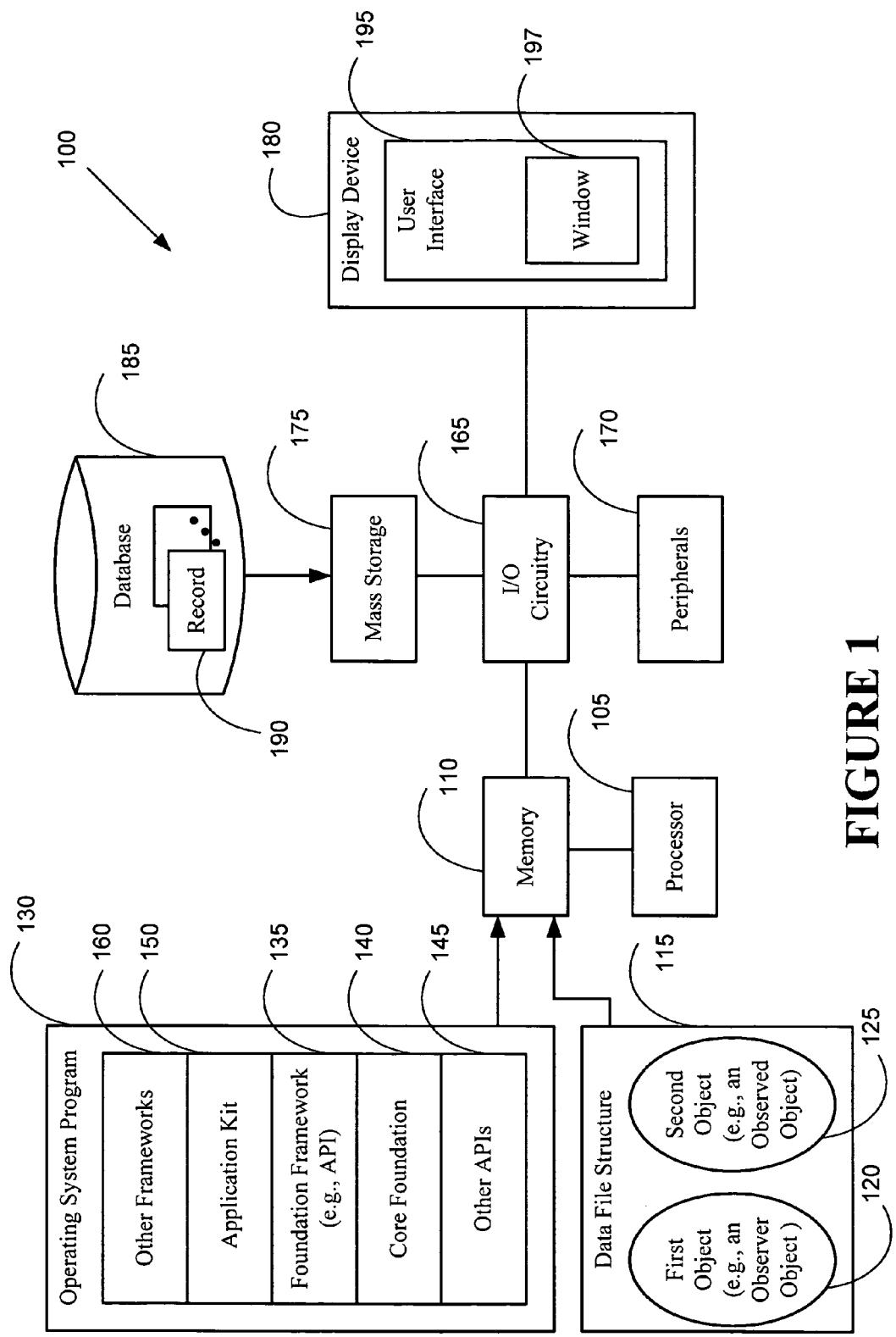
FIG. 1 illustrates an object-oriented computing system according to one illustrative embodiment of the present invention.

Referring to FIG. 1, an object-oriented computing system 100 is shown according to one embodiment of the present invention. The object-oriented computing system 100 may comprise a processor 105 coupled to a memory 110 storing a data file structure 115 including an identification of an observer object 120 and an observed object 125 in a software program, such as an operating system program 130. The memory 110 may store one or more properties and a set of methods associated with the respective observer object 120 and the observed object 125. The operating system program 130 may provide instructions for registering the observer object 120 with the observed object 125 to observe one or more properties thereof.

In one embodiment, the operating system program 130 may comprise a plurality of application programming interfaces (APIs) which may be separated into frameworks. These frameworks may include a Foundation framework 135 that resides on a core foundation 140. While the Foundation framework 135 may enable a binding feature for objects in an object-oriented environment, the core foundation 140 implements conventional APIs. The core foundation 140 may reside on other APIs 145, such as standard UNIX-based APIs. Over the Foundation framework 135, an application kit (App-Kit) framework 150 may reside. Other frameworks may reside over the AppKit framework 150.

In Macintosh Operating System (Mac OS), such as Mac OS X, application programming interfaces (APIs) are divided into frameworks including the Foundation framework 135 which supports the AppKit framework 150. The Foundation framework 135 and the AppKit framework 150 may be implemented in any of several available programming languages, such as Objective-C, an object-oriented programming language. This Foundation framework 135 may be used with a binding feature introduced earlier. However, the Foundation framework 135 may be used with other features available to an Operating System environment. In the Foundation framework 135, a class hierarchy is based on a single super class called an object class. Based on categories, the Foundation framework 135 may be implemented using the object class. A category is a feature of the Objective-C which enables addition of methods to existing classes.

In the Objective-C language, for example, a class defines the methods and instance variables for a particular kind of object. A class definition declares instance variables and defines methods for all members of the class. Objects that have the same types of instance variables and have access to the same methods belong to the same class. In the Objective-C language, a class object or object class is an object that represents a class and knows how to create new instances of the class. Class objects are created by the compiler, lack instance variables, and can't be statically typed, but otherwise behave like all other objects. As the receiver in a message expression, a class object is represented by the class name. In the Objective-C language, a class method is a method that can operate on class objects rather than instances of the class.

The memory 110 may couple an input/output (I/O) circuitry 165 to the processor 105. In turn, the I/O circuitry 165 may couple one or more peripherals 170, a mass storage device 175, and a display device 180, to the memory I/O in one embodiment. The mass storage device 175 may store a database 185 in which each object of the observer object 120 and the observed object 125 forms the basis for a record 190. Each record 190 may contain fields which respectively identify the pointers and the methods with which the record is associated.

In the display device 180, the object-oriented computing system 100 may provide an interface 195 to replace a first implementation of a method in the set of methods of the observed object 125 with a second implementation of the method that automatically invokes a notification to the observer object 120 from the observed object 125. Instead of an automatic observer notification, manual notifications may be provided in some embodiments of the present invention. The notifications are sent directly to the observer object 120 when changes are made to specific properties of the observed object 125. To provide an automatic observing capability for objects, a window 197 may be displayed on the displayed device 180 of the object-oriented computing system 100.

Figure 2:
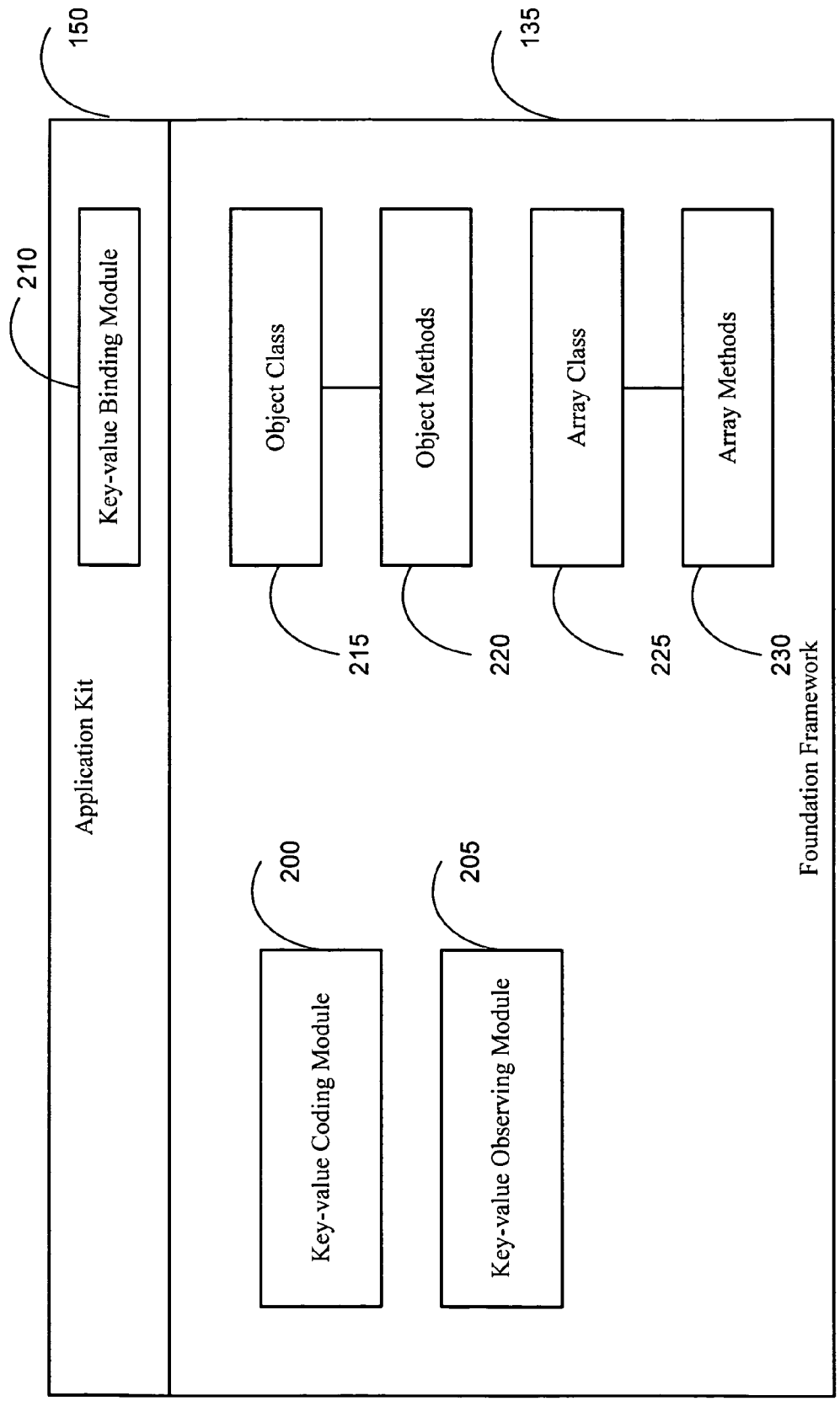
FIG. 2 illustrates an application programming interface for use with the object-oriented computing system shown in FIG. 1 in accordance with one illustrative embodiment of the present invention.

Turning now to FIG. 2, an application programming interface (API) in the form of the Foundation framework 135 is shown according to one embodiment of the present invention. The Foundation framework 135 comprises a key-value coding module 200 and a key-value observing module 205. The AppKit framework 150 comprises a key-value binding module 210. The key-value coding module 200 gives access to object properties using a very generic application programming interface (API) that identifies them by a key. In one embodiment, a key is a string, such as "graphics," or "fillColor." An object property may be an attribute, to-one relationship, or to-many relationship. The attribute may be a simple immutable value, for example, the fillColor or stroke width of a Sketch graphic. A to-one related object may have properties of its own, e.g., the image of a Sketch image graphic. The to-many related objects may be a collection of related objects, e.g., graphics of a Sketch document.

Using the key-value coding module 200 and the key-value observing module 205, the key-value binding module 210 provides an application programming interface that allows the value of an object's property to be tied to the value of another object's property. In this manner, the object that supports this binding feature may provide custom options, providing plenty of flexibility in implementation.

The observed object 125 responds to key-value observer messages because its class inherits key-value observer methods defined by an object class from the Foundation framework 135 in the key-value observing module 205. The observer object 120 may observe one or more object properties of the observed object 125 including simple attributes, to-one relationship, and too-many relationships. The observer object 120 of to-many relationships may be informed of the type of change made to a specific property of the observed object 125 as well as which objects are involved in the change.

In order to be notified of changes to a property, the observer object 120 first registers with the observed object 125 by sending a message, passing the observer object 120 a key path of a property that will be observed. In one embodiment, a key path may be a dot-separated list of keys which get handled automatically. For example, a key path, such as "selection.fillColor" may be passed. An observed class associated with the observed object 125 may be key-value observing compliant for the property that the observer object 120 wishes to observe.

For the key-value observing module 205, which is an application programming interface, to observe objects, the classes of the objects must be key-value observing (KVO)-compliant (observable) for other objects to bind to them. That is, either using manual observer notification or an automatic observer notification, the objects may be made KVO compliant. While invocations of key-value coding (KVC) methods may result in observer notifications, the notifications of KVC-compliant methods may result in observer notifications as well. To be manual KVO-compliant, the observed object 125 before any change to an attribute or to-one relationship invokes a method "will change value for key" and after the change, the observed object 125 invokes a method "did change value for key." Likewise, before any change to a to-many relationship, the observed object 125 invokes a method "will change: values at indexes: for key."

For the automatic KVO-compliance, the observed object 125 causes observer notifications for a key in message, such as "set value: for key". Likewise, a method naming pattern "-setKey:" causes observer notifications. For example, invoking a method named "-setFillColor:" automatically result in KVO notifications, unless automatic KVO is disabled for the "fillColor" key. Moreover, mutations of the result of a method naming pattern "-mutableArrayValueForKey:" causes notifications for that key. In addition, method naming patterns "-insertObject:InKeyAtIndex" and "-removeObjectFromKeyAtIndex" cause observer notifications for the key.

The Foundation framework 135 may further comprise an object class 215 and a set of associated object methods 220. In addition, the Foundation framework 135 may comprise a standard collection class, such as an array class 225 having a set of associated array methods 230, in one embodiment. In the Foundation framework 135, besides the object class 215 the array class 225 may be provided. The array class 225 encapsulates an array of objects. While the object methods 220 for the object class 215 may include a method "value for key" which returns the value of the "key" property, the array methods 230 include a first method called "add observer: to objects at indexes: for key path: options: context:" and "remove observer: from objects at indexes: for key path:"

In one embodiment, the "value for key" method searches for the object class 215 for a method of the same name, and invokes it. The "value for key" method also returns the value of the key property for to-many relationships where the related objects are not stored in the array class 225. The object methods 220 may further include a "set value: for key" method which sets the value of the key property for to-many relationships where the related objects are not stored in the array class 225. The object methods 220 may further include a "set value: for key" method which sets the value of the key property. Again, the "set value: for key" method, searches, the object class 215 for a method whose name matches, and invokes it.

The object methods 220 may include a "validate value: for key: error" method, which either returns a value good for a "set value: for key" method or returns an error, separating validation rules from decision about when to validate. Likewise, the object methods 220 may include a "mutable array value for key" method which returns a mutable array of to-many related objects. For each object method 220 there is a variant that uses a key path being a dot-separated list of keys which get handled automatically.

Using the key paths, the key-value coding module 200, enables key-value binding and key-value observing in terms of key paths. For making the object class 215 and the array class 225 KVC-compliant, the object methods 220 and the array methods 230 include methods "value for key" and "set value: for key." For each attribute or to-one relationship, method name "key" and for read write a method named "set key" may be implemented. For each to-many relationship, likewise, a method named "key", "count of key", and "object in key at index" may be implemented. For each mutable to-many relationship, a method called "insert object: in key at index" and a method called "remove object from key at index" may be implemented. In all of the above indicated methods, the word "key" in each method name may be replaced by the actual key.

For key-value observer registration, the object methods 220 may include a method called "add observer: for key path: options: context" to register one object as an observer of a property of another object. Likewise, to deregister the observer object 120, a method called "remove observer: for key path may be provided. In the "add observer: for key path: options: context" method, the options may comprise any combination of two or more possible flags so that the observer object 120 may get a new value for the property in the change notification and may get an old value from the observed object 125 before the change.

Likewise, the context defines a reason for observation which is passed back in a key value observing message. The observed object 125 contains the property to be observed and made KVO compliant for the key path. For the "add observer: for key path: options: context" method, the recipient of the notifications about changes to the property identified by the key path is the observer object 120 that may implement a key-value observing informal protocol. For example, the controls in a panel such as Sketch's inspector panel may observe the selection properties which they are bound.

For the key-value observing module 205, the object methods 200 include a method called "observe value for key path: of object: change: context," which is invoked on the observer object 120 for every change to the observed property in the observed object 125. The change parameter in this method may indicate information about what changed. A key value change kind indication for the method "observe value for key path: of object: change: context" may indicate the kind of change it was. For example, the value of an attribute or to-one relationship may be changed, when someone invoked a method called "set value: for key". Likewise, a to-many relationship may have changed when someone invoked a method called "mutable array value for key" then mutated the result. Additionally, a key value change indexes key indication may indicate the indexes of the inserted/removed/replaced objects.

The key-value observing (KVO) module 205 may be built on the key-value coding (KVC) module 200. Using the key-value coding module 200, a message may be sent to an object without the knowledge of a name of a method in the object's class 215 before getting and setting the values of the attributes in that object. The key-value coding module 200 comprises a value for key method and a set value for key method. The value for key method takes one argument and the key is a string. The string is the key of the property whose value is desired. In this way, properties of an object may be extracted without knowing how the object's class 215 implements the property getting and setting.

When the value for key method is invoked, the key-value coding module 200 searches for a method in the object's class whose name is "key." If the key method is not located, then the key-value coding module 200 searches for another method called "get key." Accordingly, if a method is not found, the key-value coding module 200 searches for instance variables for the object. For example, when sending an employee object a value for key method where key is "manager", the key-value coding module 200 attempts to execute a method named manager and if the manager method is determined to be not present, then the key-value coding module 200 searches for an instance variable whose name is "manager." The key-value coding module 200 obtains a value from the instance variable of the manager object and returns the value. In this way, the key-value coding module 200 protects clients from having to know how the properties are implemented, providing implementation freedom to key-value coding module 200 compliant classes because an instance variable is hidden behind a method.

When properties of an object, such as that of an employee class needs to be observed, for example, observing the manager property of the employee object having a method named "set manager," the creator of the employee class may make the employee object key-value coding compliant without doing anything else. That is, the employee class is automatically key-value observing compliant for the manager property as long as the manager is changed only via invocation of the "set manager" method.

In general, the key-value observing module 205 is built on the key-value coding module 200. One of the features of a method called "set value for key", which is part of the key-value coding module 200, is that if a method cannot be found whose name matches the pattern, the "set value for key" method may search for an instance variable whose name matches the pattern. In this event, the "set value for key" method will change the value of the instance variable directly. When the "set value for key" method is invoked, an automatic key value observing (KVO) notification feature operates. The key-value coding module 200 is made aware of the key-value observing module 205, e.g., if the key-value coding is going to change the value of the instance variable directly, a "will change value for key" method before the key value is changed and a "did change value for key" method after the key value is changed are called. Thus, an automatic key-value observer notification in response to key-value coding messages is provided.

A property may be changed in at least two ways. In the first way, an accessor method, such as a set key method may be called. In the second way, a generic method may be called which identifies the property of the key, i.e., a set value for key.

A relationship may be mutated using a mutable array value for key method, e.g., when one object is mutating another object, i.e., adding or removing objects from one of the objects to-many relationships may occur. For example, by calling the mutable array value for key method, to-many relationships of an object may be changed, e.g., the number of employee objects related or unrelated to the manager object may be altered. The mutable array value for key method returns, an instance of a standard array class, to add, remove or replace objects in the array by automatically relating and unrelating objects to the container object that was originally sent the mutable array value for key message. While automatic relating and unrelating of objects continues, automatic KVO notifications may be generated. In this manner, one or more properties of an object may be changed by a specific method implemented by the object's class directly or by a generic method based on the key-value coding module 200, while the automatic KVO notifications may be generated for both of these methods.

Figure 3:
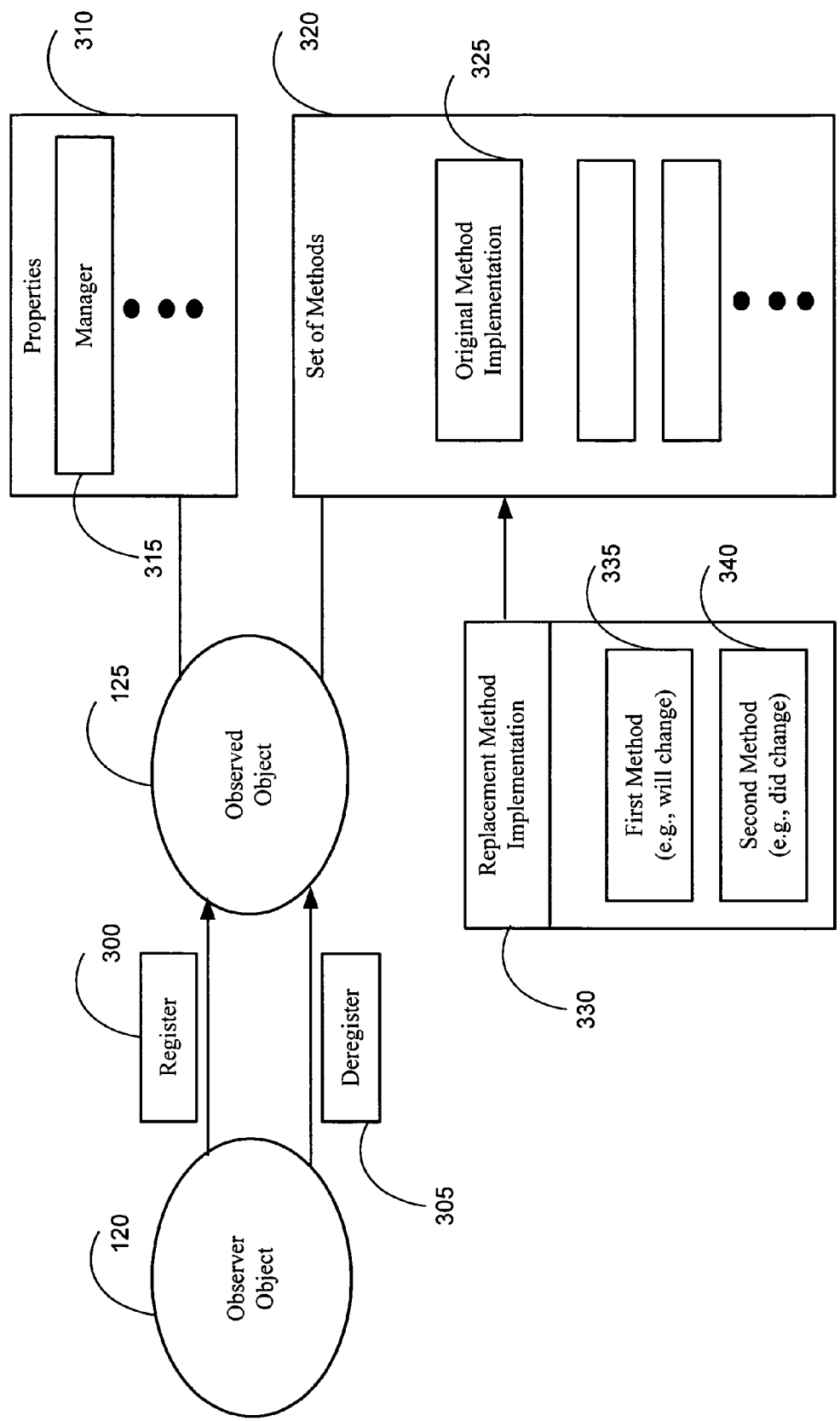
FIG. 3 illustrates a stylized representation of a method for key-value observing based on registering and deregistering of an object with another object in accordance with one illustrative embodiment of the present invention.

Referring to FIG. 3, a stylized representation of a key value observing method based on registering and deregistering of an object with another object is shown according to one embodiment of the present invention. Using the Foundation framework 135 shown in FIG. 2, the observer object 120 may register 300 with the observed object 125. Likewise, at some point, the observer object 120 may deregister 305 with the observed object 125. The observed object 125 may include one or more properties 310, such as a manager object 315. Additionally, the observed object 125 may have a set of associated methods 320 including an implementation of an original method 325. Using the Foundation framework 135 illustrated in FIG. 2, a replacement method 330 implementation may replace the original method 325 implementation. The replacement method 330 implementation may comprise a first method (e.g., a will change method) 335 and a second method (e.g., a did change method) 340.

In this manner, based on method naming rules when a set manager method call is invoked, the observer object 120 is automatically notified. In one embodiment, using a feature in Objective-C, i.e., something is an object of something else; the key-value observing module 200 utilizes a structure by pointing to it in a particular order to determine information relating to various methods that are available for the object class 215 of that object. Therefore, when the observer object 120 observes another object and an automatic key-value observing (KVO) notification feature is on, the key-value observing module 200 makes a copy of the class of the observed object 125 and replaces one of the methods in a list of methods of the observed object 125 with another method that sends out notifications while performing the same operation as the original (replaced) method was intended to perform.

Even when the property that is being changed possesses to-many relationships to one or more objects, notifications of a change may be sent out automatically as objects become related and/or unrelated to another object. This avoids writing of a relatively large piece of code for converting the objects into observable objects. Thus, in one embodiment, the observed object 125 does not need to include any additional code for being observed as long as a naming pattern established by the key-value coding module 200 is followed.

In operation, for one object to observe another object, the observer object 120 registers with the observed object 125. An object sends a method to another method, e.g., called "add observer for key path: options and contexts" where options are getting old and new values as part of the observer notification and context enables passing these values back to the invoking object. To add an observer, a pointer is passed to an object which is going to be observed. A key path, which is a series of property names separated by dots that get passed around in the APIs when dealing with keys in the context of key-value coding, may be used by the observer.

For example, a person record 190 of a person object may have a to-one relationship to an address object having an attribute as a zip code. The key path in this case would be address.zipcode. By observing the address.zipcode, the zip code of a person may be observed even though the person object does not have the zip code attribute. An "add observer for key path" method may be sent to the observed object 125, registering one object as an observer for another object. However, an object does not have to register itself an observer because one object can register another object as an observer for the observer object 120. A "remove observer for key path" method operates exactly opposite that of "add observer for key path" method, deregistering an object as an observer. Using these two methods, an object registers 300 and deregisters 305 as an observer for another object, respectively.

The observer object 120 implements a method named "observe value for key path change context." When a property of the observed object 125 changes, a notification is sent out to each one of the observer objects that identifies the key path of the property that was observed and now changing, the object that owns the property that is changing, information on exactly what changed, and the context which is the value specified when an object registered as an observer and that value is passed back to the observer. Thus, the observer object 120 registers itself and listens for notifications.

To be an observed object, the observed object 125 may be devised to be key-value observing (KVO) compliant for a specific property that may be observed by an observer object. A key-value observing compliant observed object follows certain conventions for a specific property. For example, when using an automatic KVO notification, by ensuring that any changes made to the observed object's properties 310 goes to the set method that has the correct name, set manager for the employee object.

When, the manager property 315 changes, the change is done through set method to make the observed object 125 KVO compliant. In this manner, any object can observe the manager property 315 of the observed object 125 and the observer object 120 gets notified automatically when the manage property 315 changes. For an object to be KVO compliant entails that before an object's value is going to be changed, a call is made to a method called "will change" value for key 335 and after the change is made a call is made to a method called "did change" value for key 340 where key being the manager property 315. The automatic KVO feature invokes these both methods 335, 340 automatically at an appropriate time, in one embodiment.

By sending a method to a class instead of an instance of a class, a class may be allowed to declare that the value of one or more of its properties is inherently dependent or affected by the value of one or more of its other properties. For example, when an application is starting up, a program can declare that value of one property depends upon another property. In this manner, whenever the value of one property changes, an assumption may be made that the value of the other property changed as well. An observer notification may be sent indicating this change.

Instead of calling the first method, i.e., the will change value for key method 335 and the second method, i.e., the did change value for key method 340 for a model object with a class called person having a first name and a last name and a full name property it can be declared that the persons full name depends upon the first name and last name so whenever the person class performs the will change and did change value for key methods 335 and 340 for the first name or the last name, the observer of the objects full name gets notified that the full name is changed. That is, when a set first name method is invoked, observers of the full name may be automatically notified that the full name is changed.

When one object registers itself as an observer of another object, the observer object 120 may specify that a notification from the observed object is desired immediately upon the registration. In this way, using an option for an immediate notification, any tasks the observer object 120 must perform at initial observer registration time as well as when the observed property changes can be consolidated in one place in the implementation of the observer object's class. When using an observe value key path method, e.g., the observer object 120 arranges so that the observer value key path method may be called automatically because the observer object 120 is registering itself as an observer of the observed object 125. That is, without executing any additional code the observer value key path method may be called. Upon receiving a notification that one or more objects have become related or unrelated, the observer object 120 may selectively choose to observe the properties of now related objects based on the option for an immediate notification in one place.

Figure 4:
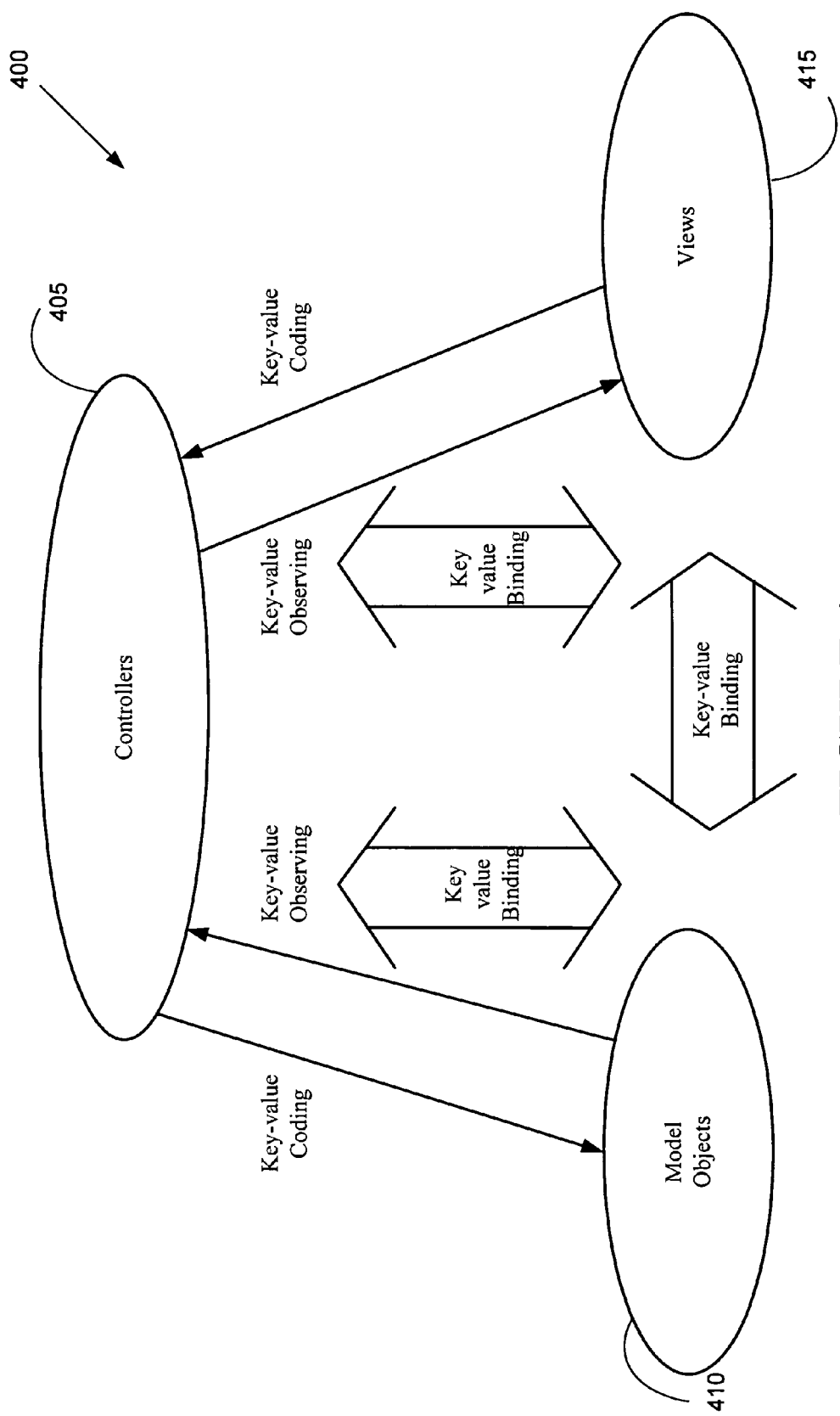
FIG. 4 illustrates a model-view-controller architecture for user interface programming of the application programming interface shown in FIG. 2 according to one illustrative embodiment of the present invention.

Referring to FIG. 4, a model-view-controller architecture 400 for user interface programming is depicted for the object-oriented computing system 100 shown in FIG. 1 according to one embodiment of the present invention. The model-view-controller architecture 400 may comprise one or more controllers 405, one or more model objects 410 and associated views 415. The controllers 405 may be classes, such as array controller class, object controller class, and user defaults controller class. The model objects 410 may be objects that are KVC-compliant for other objects to bind to them. An example of the views 415 may be a table view.

The key-value coding module 200 enables the views 415 to get and set values in the controller's 405. In addition, the key-value coding module 200 enables the controllers 405 to get and set values in the model objects 410. The key-value observing module 205 enables the views 415 be notified of changes to values in the controllers 405. Moreover, the key-value observing module 205 enables the controllers 405 be notified of changes to values in the model object 410. The key-value binding module 210 binds the named properties of the views 415 and the controllers 405 to the properties in the controllers 405 and the model object 410. This binding enables observing using the key-value observing module 205. The binding also enables updating of bound-to values in response to user actions using the key-value coding module 200.

For example, a table view's contents may be bound to an array controller's "arranged objects." The array controller's contents array may in turn be bound to a to-many relationship of a model object. In this manner, the array controller class may manage the life cycle of an array of objects. For instance, the KVO notifications from the model objects 410 may cause KVO notifications to the corresponding table views 415.

As one example, for a class called "an array controller" a table view may be bound to it, i.e., the table view receives values from the array controller class. The array controller class may be bound with a to-many relationship to other objects. Because of this binding of the contents of the array controller class, the array controller class passes the related objects to the table view using the key-value coding module 200 and the key-value observing module 205. In this manner, the array controller class may potentially observe the related objects.

The array controller class may include a feature, i.e., when a user selects many objects in the table view, the feature exposes a property called "selection" for values that are common to each of the rows in the table view. Based on a master-detail relationship, an inspector window, such as the window 197 may show properties of the selected objects because the array controller class observes each of the related objects. If all of the related objects have an exact same value, then that value appears in the inspector window for a property. Otherwise, if for selected rows of the table view the related objects possess different values, then in the inspector window a place holder appears, indicating the presence of multiple values in a user interface. For registration and deregistration as an observer of the related objects, the array controller class may accomplish common overhead associated with observer registration and deregistration once for the related objects and apply the same over again and again to each observed object.

Using the array controller class, the key-value binding module 210 may bind the "selection indexes" of a table view to an array controller's "selection indexes". Likewise, the properties of user interface controls may be bound to a key path, such as "selection.modelKey". Changes to the selection indexes may cause KVO notifications for every substantially observed key path selection.modelKey. In addition, the key-value binding module 210 may bind the properties of user interface controls, to "selection.modelKey" of an object controller class. The key-value binding module 210 may bind the object controller's "object relationship" to a to-one relationship of a model object, or another controller. In this manner, the object controller class may manage the life cycle of an object. Using the key-value binding module 210, a user defaults controller class may bind the values of user interface controls to "value.preferencesKey" of a user defaults controller. The user defaults controller class provides an easy access to up-to-date preferences values via the key-value observing module 205 to other parts of an application.

Figure 5:
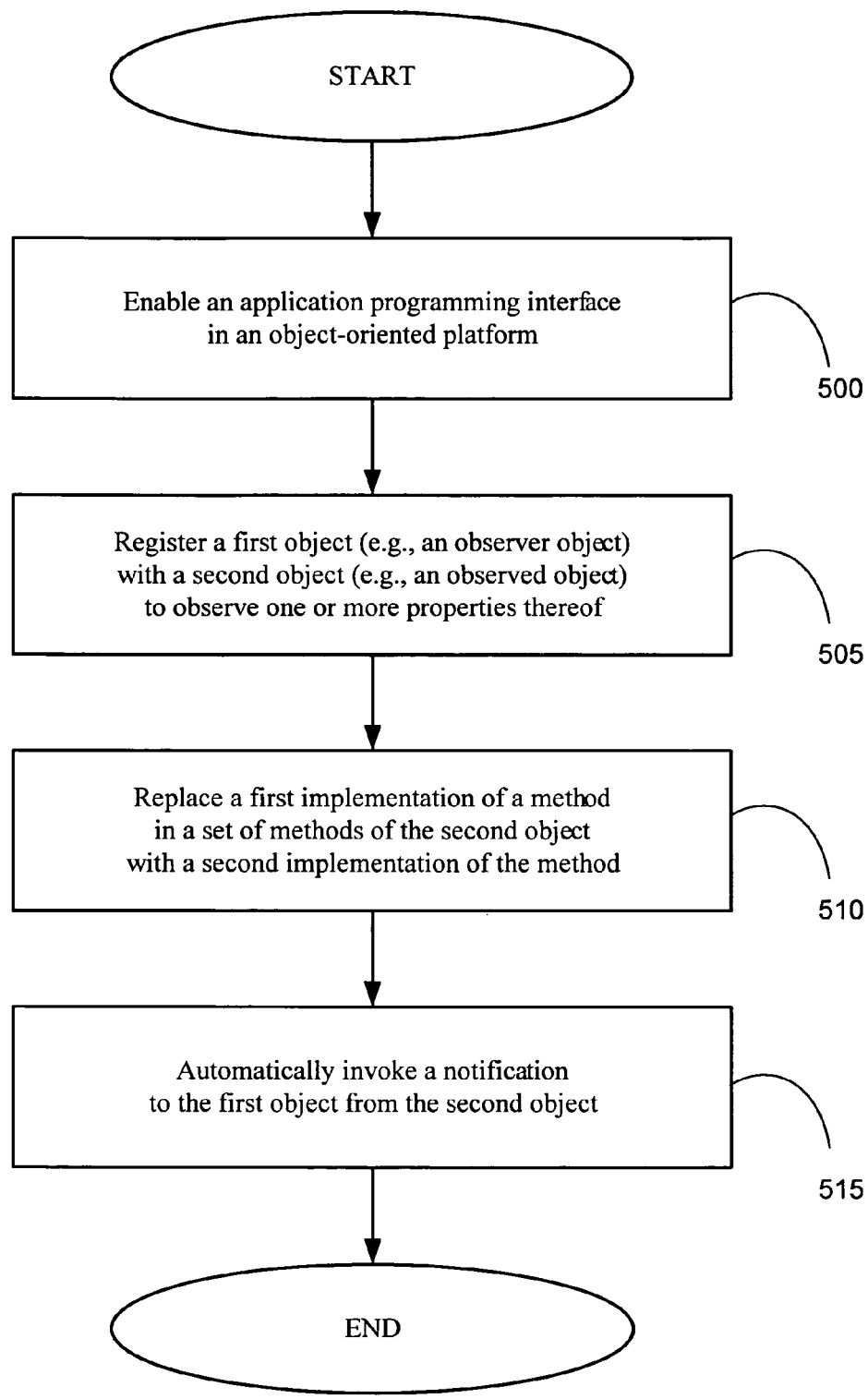
FIG. 5 illustrates a stylized representation of a method for key-value observing for user interface programming of the application programming interface shown in FIG. 2 in accordance with one illustrative embodiment of the present invention.

Referring to FIG. 5, a stylized representation of a method for key-value observing in accordance with one embodiment of the present invention is shown. At block 500, an application programming interface, such as the Foundation framework 135 and the AppKit framework 150 shown in FIG. 2 may be provided in an object-oriented platform on a system, such as on the object-oriented computing system 100 shown in FIG. 1. At block 505, a first object (e.g., the observer object 120) may register with a second object (e.g., the observed object 125) to observe one or more properties thereof. The observed object 125 may have associated the set of associated methods 320, as shown in FIG. 2. At block 510, the original method 325 implementation may be replaced with the replacement method 330 implementation of a method from the set of methods 320. At block 515, a notification may be invoked automatically to the observer object 120 from the observed object 125. The notification may indicate a change to one or more properties of the observed object 125.

The method implementation replacement that is used to implement automatic KVO notification may be implemented in two ways in some embodiments of the present invention. The first implementation involves changing the object's class pointer (the "is a," in the Objective-C language) to point to a newly created class that is merely a copy of the object's original class, and then mutating the class copy's method list. This is how KVO may be implemented for performance because there is no cost attributable to the KVO autonotification feature in objects that are not observed at all. In KVO's this implementation, the object's class pointer is actually changed back to the original value (pointing to the original class) when enough observers are deregistered that automatic KVO notification does not need to be done at all anymore, for that object. The second implementation involves leaving the object's class pointer alone, and mutating the original class' method list.

Figure 6:
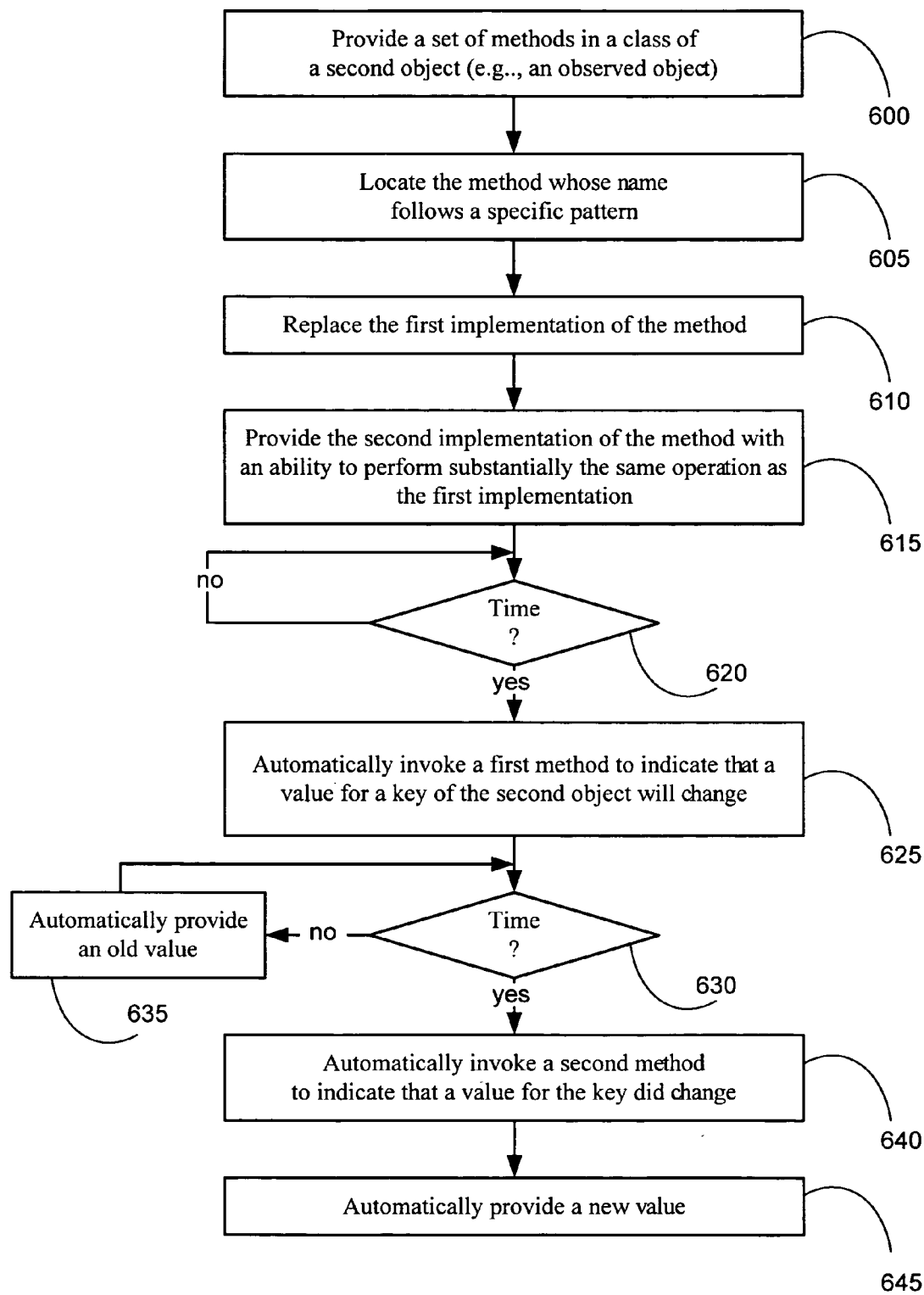
FIG. 6 illustrates a method for providing an automatic key-value observing notification for user interface programming of the application programming interface shown in FIG. 2 according to one illustrative embodiment of the present invention.

Referring to FIG. 6, a stylized representation of a method for providing an automatic key-value observing notification is shown in accordance with one illustrative embodiment of the present invention. At block 600, a set of methods may be provided in a class of a second object (e.g., the observed object 125). In the set of methods, at blocks 605, a method whose name follows a specific pattern may be located. The first implementation of the method may be replaced in block 610. At block 615, the second implementation of the method may be provided with in ability to perform substantially the same operation as the first implementation. At an appropriate time, indicated by a decision block 620, in block 625 a first method may be automatically invoked to indicate that a value of a key of the second object will change. At a decision block 630, before a value of a key changes, at block 635 an old value may be automatically provided for the key. At an appropriate time, at block 640 a second method may be automatically invoked to indicate that a value of the key did change. At block 645, the new value may be automatically provided.

The observer object 120 may specify one or more options when it registers as the observer of an observed object 125. However, one object may register another object as the observer of a property of a different object. In a first option, when the observer object 120 receives a notification from the observed object 125, a new value of a property, such as the manager property 315 may be obtained automatically from the observed object 125. Optionally, even the old value of the property may be obtained automatically in the notification, useful for example in an undo operation. For both the values of the property to be included in the notification, the observed object 125 arranges for automatic invoking of both the will change value for the key method 335 and did change value for the key method 340 at an appropriate time.

For example, when the will change value for the key method 335 is invoked, if any of the registered observers including the observer object 120 desires the old value of the key before it changes, registered observers get the old value automatically and may be recorded. The key may be some identifier of the property, in one embodiment. When the did change value for key method 340 is invoked, if any of the registered observers seek to obtain the new value of the key for the property after the change, the registered observers get the new value automatically. In both the cases, using a value for key method of the key-value coding module 200, the will change and did change methods 335, 340 provide the old and new values, respectively.

If multiple objects are related to an object, e.g., a plurality of employee objects are related to a manager object, after a change in relationships between the employee objects and the manager object, specific employee objects which become related or unrelated to the manager object may be indicated in one embodiment. To this end, in an observer notification a dictionary comprising information about the changes may be included. This change information may include the old and new values for a key of a property. The change information may indicate the kind of change, e.g., whether the value for key is set or other options, such as insertion, removal or replacement may be exercised. For example, when an object is related to a relatively large number of other objects, an addition of a single object at the end of the list of the hundred objects may be specifically indicated rather than indicating that a change involving one hundred one objects occurred in object relationships.

A class, such as an index set class which keeps track of a scattered set of indexes into an array may represent insertions of objects in different places in the array. When in a user interface, the indexed objects are shown in a table view, a user may be able to select many different objects in the list for removal and this removal of scattered objects may be indicated in a single observer notification exactly indicating which objects were removed from the list.

Figure 7:
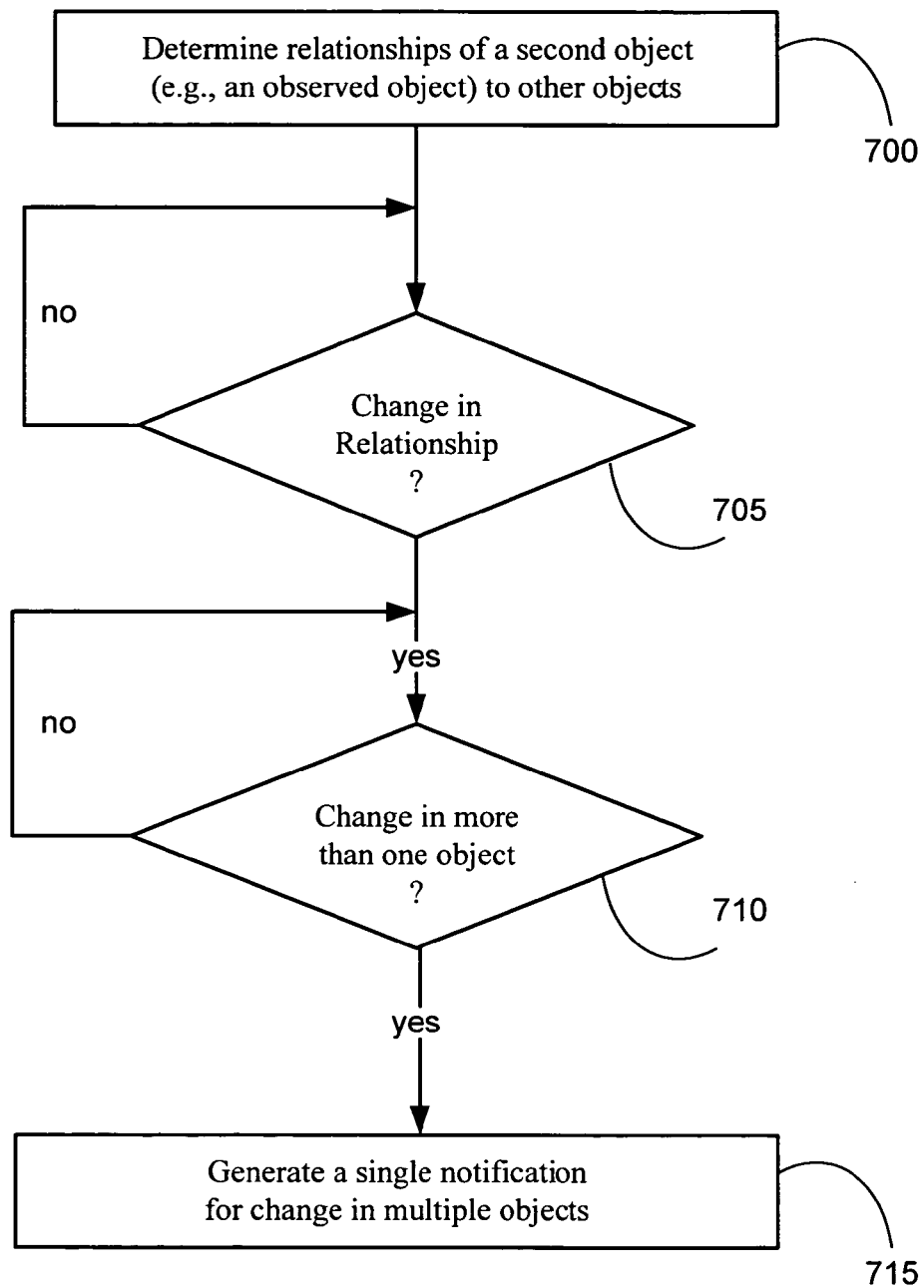
FIG. 7 illustrates a stylized representation of a method for generating a single notification for multiple objects in accordance with one illustrative embodiment of the present invention.

Referring to FIG. 7, a stylized representation of a method for generating a single notification for multiple objects in accordance with one embodiment of the present invention is illustrated. At block 700, relationships of the observed object 125 to other objects may be determined. At a decision block 705, a check may be made to ascertain whether a change in relationship has occurred. Thus, at the decision block 705, a change in relationship may be determined. That is, change in a relationship of the relationships of the observed object 125 to other objects may be ascertained. If a change in a relationship is indicated at the decision block 705, at a decision block 710, a check is made to determine whether change in relationship has occurred in more than one object. At block 715, a single notification may be generated, indicating a change in relationships of multiple objects.

When removing, for example, multiple rows from a table view where the rows are scattered all across the table, only one observer notification from the observed object 125 to the observer object 120 may be generated instead of generating one observer notification per row. In other words, the observed object 125 generates a single notification to the observer object 120 for a change in status of some of the multiple objects. The change in status of some of the multiple objects includes at least on of insertion, removal and replacement of some of the objects in the to-many relationship.

Figure 8:
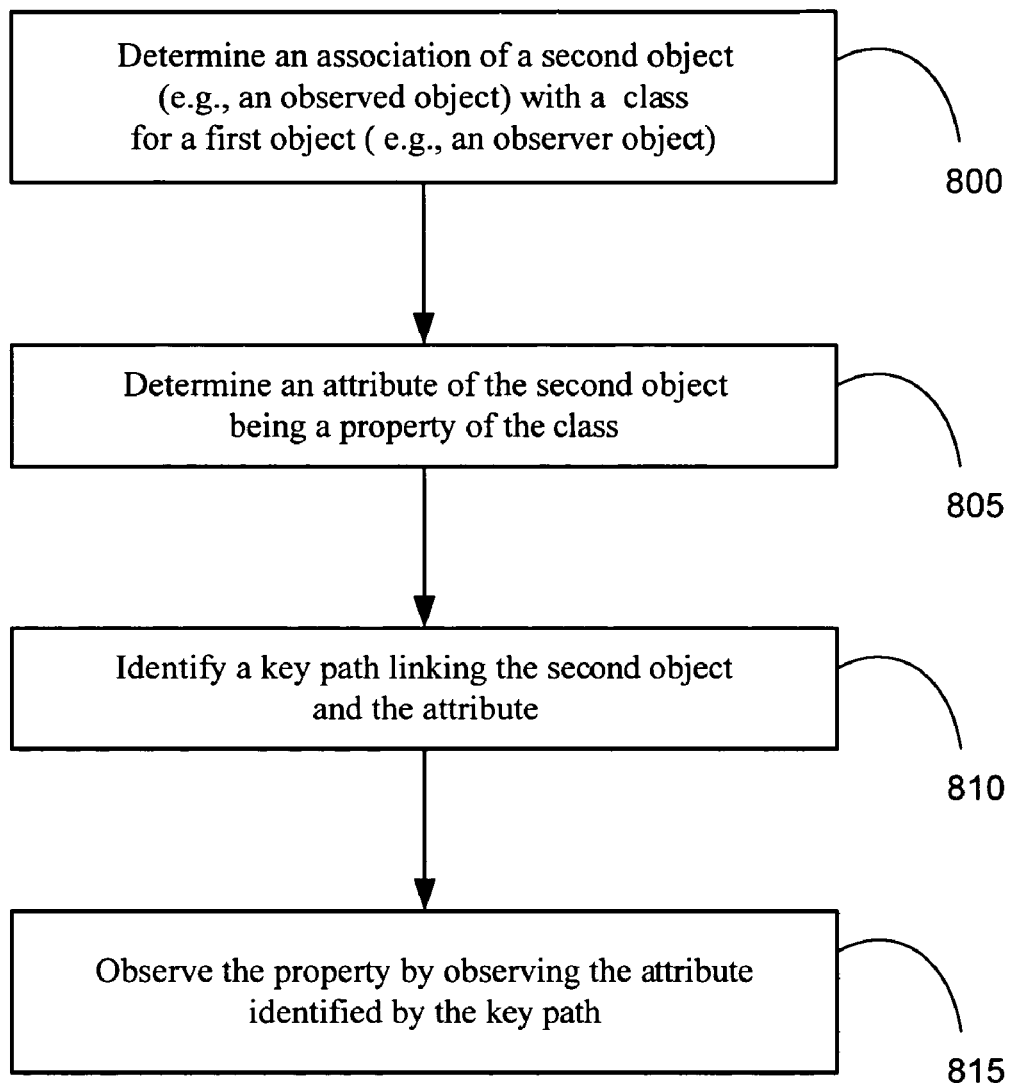
FIG. 8 illustrates a stylized representation of a method for observing a property by observing an attribute identified by a key path in accordance with one illustrative embodiment of the present invention.

Referring to FIG. 8, a stylized representation of a method for observing a property by observing an attribute identified by a key path is depicted in accordance with one embodiment of the present invention. At block 800, an association of the observed object 125 with a class may be determined for the observer object 120. At block 805, an attribute of the observed object 125 may be determined to be a property of the class. A key path may be identified, linking the observed object 125 and the attribute, at block 810. In this manner, the property may be observed by observing the attribute identified by the key path at block 815.

For example, a person class may have an address object associated as an instance of an address class and a zip code may be an attribute of the address object. An observer can observe a person's address by observing "address.zipcode." When the zip code of the address gets changed, the observer of the address.zipcode may be notified. If the entire address object of the person is swapped out, all the observers of the address.zipcode may be notified. Thus, when properties get chained up as nested sub-properties, an automatic notification to all the observers may be issued.

While the invention has been illustrated herein as being useful in an object-oriented based computer environment, it also has application in other building block based programming environments. For example, the present invention may have application in any environment where two or more programming building blocks or software entities are interconnected and capable of communicating with one another.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for providing an application programming interface in an object-oriented programming platform, the method comprising:

registering a first object comprising at least one property with a second object to observe one or more properties associated with said second object, said second object having a set of methods associated therewith, wherein the set of methods comprises routines used by the second object to do at least one of access data or perform an action, wherein a value of the at least one property of the first object is tied to a value of the one or more properties associated with the second object;

replacing a first implementation of a method in the set of methods associated with said second object with a second implementation of the method that automatically sends a notification to said first object; and storing said first and second object into a database, each object of said first and second objects forming the basis for a record in the database, and each record containing fields which respectively identify the pointers and the methods with which the record is associated.

2. A method, as set forth in claim 1, further comprising:
providing the set of methods in a class of said second object; and
locating the method whose name follows a specific pattern in the set of methods of said second object.

3. A method, as set forth in claim 2, further comprising:
providing the second implementation of the method with an ability to perform substantially the same operation as the first implementation of the method.

4. A method, as set forth in claim 2, further comprising:
Allowing a declaration that a value of at least one property of said one or more properties depends upon and gets affected by a value of another property of said one or more properties.

5. A method, as set forth in claim 1, wherein replacing a first implementation of a method further comprising:
automatically invoking a first method at an appropriate time to indicate that a value for a key associated with said second object will change; and
automatically invoking a second method at an appropriate time to indicate that the value for the key did change.

6. A method, as set forth in claim 5, further comprising:
invoking the first implementation of the method.

7. A method, as set forth in claim 5, further comprising:
after a change in the value, automatically providing the new value of a keyed property of said second object to said first object.

8. A method, as set forth in claim 5, further comprising:
after a change in the value, automatically providing the old value of a keyed property of said second object to said first object.

9. A method, as set forth in claim 1, further comprising:
determining one or more relationships of said second object to other objects; and
in response to a change in a relationship between said second object and at least one of said other objects, indicating only the change in the relationship of said at least one object and said second object within the notification.

10. A method, as set forth in claim 9, further comprising:
generating a single notification from said second object to said first object for a change in status of at least two objects of said other objects.

11. A method, as set forth in claim 10, further comprising:
causing the change in status of said at least two objects of said other objects including at least one of insertion, removal and replacement of said at least two objects.

12. A method, as set forth in claim 1, further comprising:
registering an object as an observer of a plurality of objects in a batch that performs a common overhead associated with registration of said plurality of objects only once.

13. A method, as set forth in claim 1, further comprising:
deregistering an object as an observer of a plurality of objects in a batch that performs a common overhead associated with deregistration of said plurality of objects only once.

14. A method, as set forth in claim 1, further comprising:
determining an association of said second object with a class;
determining an attribute of said second object being a property of said class;
identifying a key path linking said second object and said attribute; and
observing said property by observing the attribute identified by said key path.

15. A method, as set forth in claim 1, further comprising:
upon registration of said first object, allowing said first object being observer of a property of said one or more properties of said second object to be notified immediately of a value of the observed property.

16. A method, as set forth in claim 1, further comprising:
causing one or more key-value observing notifications to said first object in response to one or more key-value coding messages to said second object.

17. An article comprising a computer readable storage medium storing instructions that, when executed cause a processor-based system to:
register a first object comprising at least one property with a second object to observe one or more properties associated with said second object, said second object having a set of methods associated therewith, wherein the set of methods comprises routines used by the second object to do at least one of access data or perform an action, wherein a value of the at least one property of the first object is tied to a value of the one or more properties associated with the second object;
replace a first implementation of a method in the set of methods associated with said second object with a second implementation of the method that automatically sends a notification to said first object; and
store said first and second object into a database, wherein the objects of said first and second objects form the basis for a record in the database, and each record contains fields which respectively identify the pointers and the methods with which the record is associated.

18. An article, as set forth in claim 17, comprising a medium storing instructions that, when executed cause a processor-based system to:
provide the set of methods in a class of said second object; and
locate the method whose name follows a specific pattern in the set of methods of said second object.

19. An article, as set forth in claim 18, comprising a medium storing instructions that, when executed cause a processor-based system to:
provide the second implementation of the method with an ability to perform substantially the same operation as the first implementation of the method.

20. An article, as set forth in claim 18, comprising a medium storing instructions that, when executed cause a processor-based system to:
allow the declaration that a value of at least one property of said one or more properties depends upon and gets affected by a value of another property of said one or more properties.

21. An article, as set forth in claim 17, comprising a medium storing instructions that, when executed cause a processor-based system to:

automatically invoke a first method at an appropriate time to indicate that a value for a key associated with said second object will change; and automatically invoke a second method at an appropriate time to indicate that the value for the key did change.

22. An article, as set forth in claim 21, comprising a medium storing instructions that, when executed cause a processor-based system to:

invoke the first implementation of the method.

23. An article, as set forth in claim 21, comprising a medium storing instructions that, when executed cause a processor-based system to:

after a change in the value, automatically provide the new value of a keyed property of said second object to said first object.

24. An article, as set forth in claim 21, comprising a medium storing instructions that, when executed cause a processor-based system to:

after a change in the value, automatically provide the old value of a keyed property of said second object to said first object.

25. An article, as set forth in claim 17, comprising a medium storing instructions that, when executed cause a processor-based system to:

determine relationships of said second object to other objects; and in response to a change in a relationship between said second object and at least one of said other objects, indicate only the change in the relationship of said at least one object and said second object within the notification.

26. An article, as set forth in claim 25, comprising a medium storing instructions that, when executed cause a processor-based system to:

generate a single notification from said second object to said first object for a change in status of at least two objects of said other objects.

27. An article, as set forth in claim 26, comprising a medium storing instructions that, when executed cause a processor-based system to:

cause the change in status of said at least two objects of said other objects including at least one of insertion, removal and replacement of said at least two objects.

28. An article, as set forth in claim 17, comprising a medium storing instructions that, when executed cause a processor-based system to:

register an object as an observer of a plurality of objects in a batch that performs a common overhead associated with registration of said plurality of objects only once.

29. An article, as set forth in claim 17, comprising a medium storing instructions that, when executed cause a processor-based system to:

deregister an object as an observer of a plurality of objects in a batch that performs a common overhead associated with deregistration of said plurality of objects only once.

30. An article, as set forth in claim 17, comprising a medium storing instructions that, when executed cause a processor-based system to:

determine an association of said second object with a class;

determine an attribute of said second object being a property of said class;

identify a key path linking said second object and said attribute; and observe said property by observing the attribute identified by said key path.

31. An article, as set forth in claim 17, comprising a medium storing instructions that, when executed cause a processor-based system to:

upon registration of said first object, allow said first object being observer of a property of said one or more properties of said second object to be notified immediately of a value of the observed property.

32. An article, as set forth in claim 17, comprising a medium storing instructions that, when executed cause a processor-based system to:

cause one or more key-value observing notifications to said first object in response to one or more key-value coding messages to said second object.

33. An object-oriented computing system, the system comprising:

a processor;

a memory coupled to said processor, said memory storing a data file structure including an identification of a first and a second object in a software program, one or more properties and a set of methods associated with respective said first and second objects and instructions for registering said first object with said second object to observe said one or more properties associated with said second object, wherein a value of the one or more properties associated with the first object is tied to a value of the one or more properties associated with the second object, and wherein said data file structure comprises a database in which each object of said first and second object forms the basis for a record in the database, and each record contains fields which respectively identify the pointers and the methods with which the record is associated; and an interface to replace a first implementation of a method in the set of methods associated with said second object with a second implementation of the method that automatically invokes a notification to said first object from said second object.

34. The object-oriented computing system of claim 33, wherein said software program is an operating system program and said memory storing a key-value observing module by which objects may be registered and deregistered as observers of specific properties of other objects, and by which observed objects may notify observers of changes to properties.

35. The object-oriented computing system of claim 33, wherein said interface comprises:

a window that is displayed on a display device of the computing system.

36. An application programming apparatus for managing relationships of objects in an object-oriented computing system, the application programming apparatus comprising:

means for registering a first object comprising one or more properties with a second object to observe one or more properties associated with said second object, said second object having a set of methods associated therewith, wherein a value of the one or more properties of the first object is tied to a value of the one or more properties associated with the second object;

means for replacing a first implementation of a method in the set of methods associated with said second object with a second implementation of the method that automatically sends a notification to said first object; and means for storing said first and second objects, wherein the objects of said first and second objects form the basis for a record in the database, and each record contains fields which respectively identify the pointers and the methods with which the record is associated.

37. An application programming apparatus, as set forth in claim 36, further comprising:
   means for providing the set of methods in a class of said second object; and
   means for locating the method whose name follows a specific pattern in the set of methods of said second object.

38. An application programming apparatus, as set forth in claim 36, further comprising:
   means for automatically invoking a first method at an appropriate time to indicate that a value for a key associated with said second object will change; and
   means for automatically invoking a second method at an appropriate time to indicate that the value for the key did change.

39. An application programming apparatus, as set forth in claim 36, further comprising:
   means for determining one or more relationships of said second object to other objects; and
   means for indicating only the change in a relationship of said at least one object and said second object within the notification in response to a change in the relationship between said second object and at least on of said other objects.

* * * * *

UNITED STATES PATENT AND TRADEMARK OFFICE
CERTIFICATE OF CORRECTION

| | | |
|---|---|---|
| PATENT NO. | : 7,954,110 B1 | Page 1 of 1 |
| APPLICATION NO. | : 10/873697 | |
| DATED | : May 31, 2011 | |
| INVENTOR(S) | : Ronald D. Lue-Sang et al. | |

It is certified that error appears in the above-identified patent and that said Letters Patent is hereby corrected as shown below:

IN THE SPECIFICATIONS:
In column 14, line 20, delete "on of insertion," and insert -- one of insertion, --, therefor.

IN THE CLAIMS:
In column 20, line 11, in Claim 39, delete "on of" and insert -- one of --, therefor.

Signed and Sealed this
Twenty-ninth Day of November, 2011

David J. Kappos
*Director of the United States Patent and Trademark Office*